Sept. 20, 1960 G. R. SMITH 2,953,069
DEVICE FOR MULTIPLE MACHINING OF WORK PIECES
Filed Oct. 18, 1954 5 Sheets-Sheet 1

INVENTOR.
GORDON RAYMOND SMITH
BY
Barnes, Kisselle, Laughlin & Raisch
ATTORNEYS

Sept. 20, 1960 G. R. SMITH 2,953,069
DEVICE FOR MULTIPLE MACHINING OF WORK PIECES
Filed Oct. 18, 1954 5 Sheets-Sheet 3

INVENTOR.
GORDON RAYMOND SMITH
BY
Barnes, Kisselle, Laughlin & Raisch
ATTORNEYS

INVENTOR.
GORDON RAYMOND SMITH
BY
ATTORNEYS

United States Patent Office 2,953,069
Patented Sept. 20, 1960

2,953,069

DEVICE FOR MULTIPLE MACHINING OF WORK PIECES

Gordon Raymond Smith, 1511 E. Eight Mile Road, Hazel Park, Mich., assignor of one-half to Earl R. Lowe, East Detroit, Mich.

Filed Oct. 18, 1954, Ser. No. 462,714

8 Claims. (Cl. 90—11.44)

This invention relates to a device for performing multiple machining operations simultaneously on a number of relatively large work pieces.

An exemplary application of the invention lies in milling and threading portions of cast gate valve bodies to form seats for bronze sealing rings. Heretofore such machining has been done on a boring mill or turret lathe with the gate valve body being rotated relatively to a tool to accomplish the machining. This type of operation has been unsatisfactory for a number of reasons. The bulk of a work piece such as a gate valve body requires the use of large, heavy machine tools which are expensive, relatively slow operating and often objectionably inaccurate. The machine tools themselves are large and take up a great deal of factory floor space and still only one work piece at a time can be machined thereon. To produce work pieces such as gate valve bodies in quantity is expensive of money, time, factory space and requires the services of a relatively large number of machine tool operators.

It is an object of this invention to provide an improved device for automatically performing multiple machining operations simultaneously on a number of bulky work pieces such as gate valve bodies.

In accordance with the invention, a number of machine tools, which may include planetary heads of the types disclosed in Norberg 2,312,354, March 2, 1943, or Norberg 2,553,669, March 22, 1951 are positioned at machining stations adjacent a rotatable table having a number of work piece holding fixtures thereon. The table is rotated to carry the fixtures and work pieces thereon to the machining stations and the fixtures are rotated on the table to present different portions of the work pieces to the machine tools for machining operations. Automatic means are provided for rotating the table and fixtures and for moving the machine tools to and from operative position. One form of the invention is shown in the accompanying drawings which may briefly be described as follows:

Fig. 7 is a sectional view on line 7—7 of Fig. 5.

Figure 1:
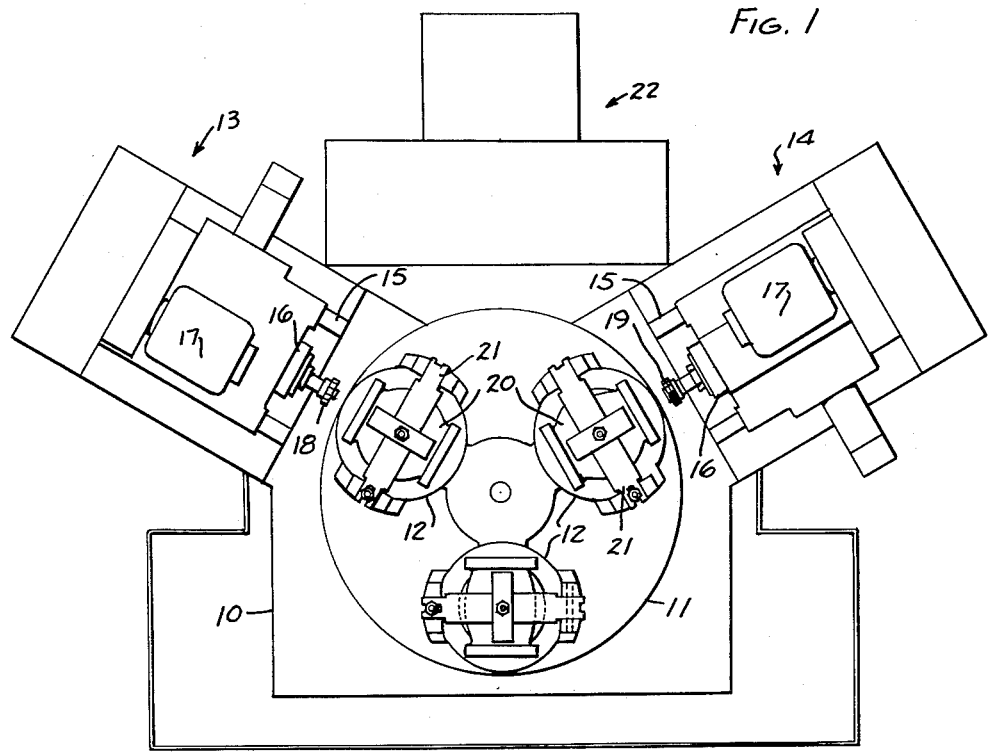
Fig. 1 is a partly diagrammatic plan view of a device according to this invention for machining gate valve bodies.
Figure 2:
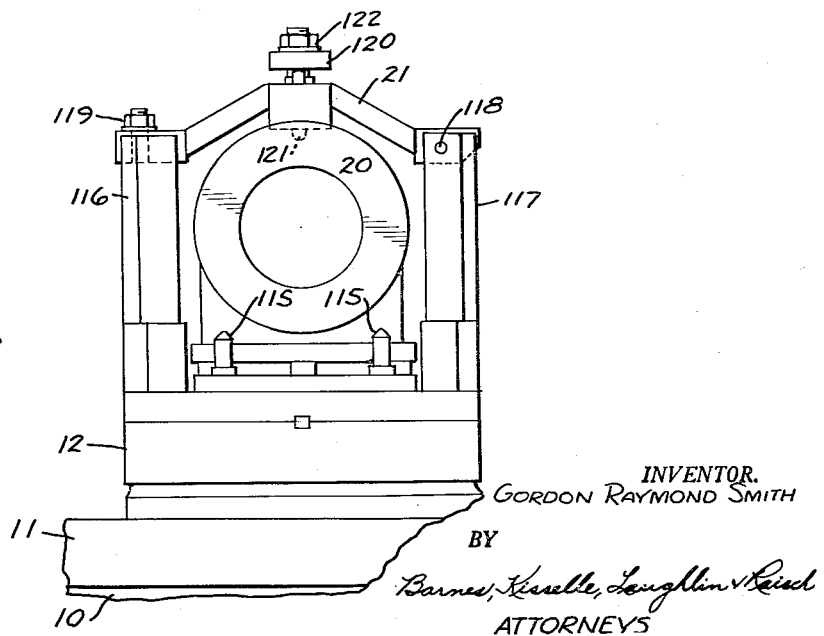
Fig. 2 is an elevational view of a gate valve body clamped on a fixture.

Fig. 1 shows a device having a base 10 with a table 11 rotatable thereon and having three fixtures 12 rotatably mounted on the table. Machine tools 13 and 14 are mounted on tracks 15 adjacent the table at the machining stations. Each machine has a planetary head 16 preferably of the type disclosed in Norberg 2,312,354 driven by an electric motor 17. Machines 13 and 14, respectively, carry a milling tool 18 and a threading tool 19 for performing operations on circumferential seat portions 23 and radial seat faces 24 of gate valve bodies 20 secured on fixtures 12 by clamps 21. Hydraulic and electrical control apparatus may be housed in a cabinet 22.

Figure 3:
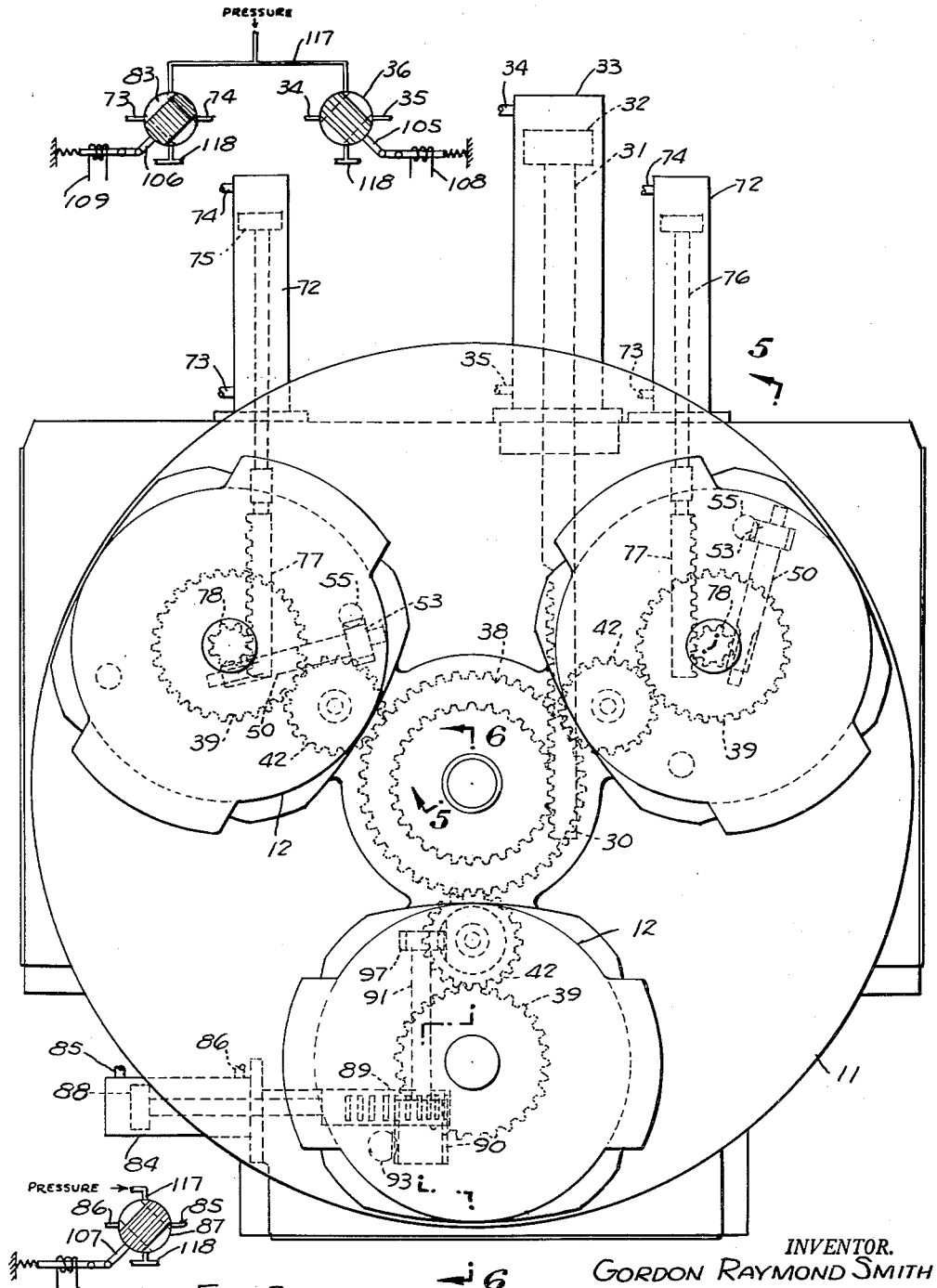
Fig. 3 is an enlarged partly diagrammatic plan view of the rotatable table and fixtures with some parts shown in phantom.
Figure 5:
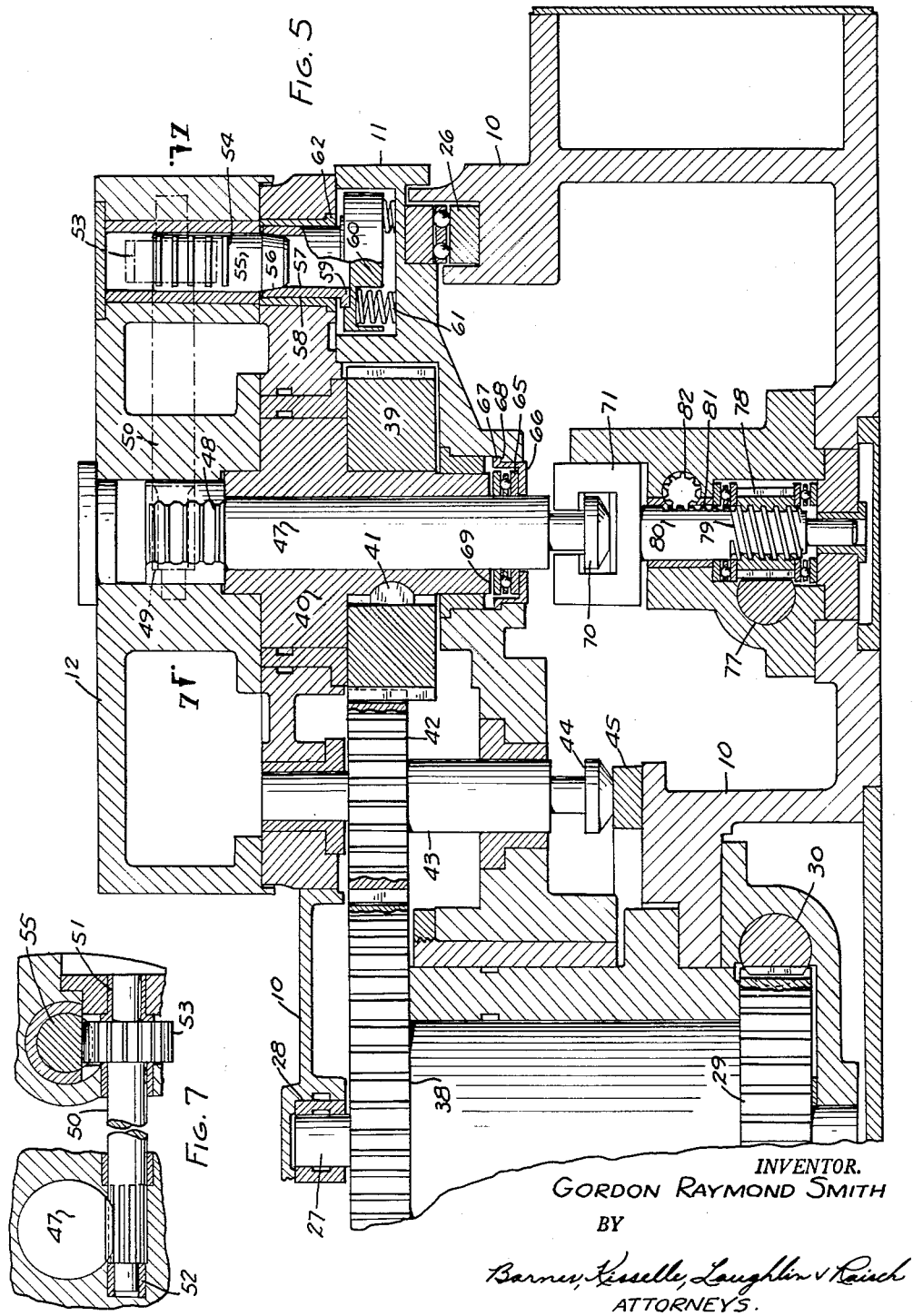
Fig. 5 is an enlarged, partly diagrammatic, sectional view taken on line 5—5 of Fig. 3.

Table 11 is rotatably connected to base 10 through bearings 26. A shaft 27 is journaled at the center of table 10 as shown at 28 and carries a gear 29 engageable by a reciprocable gear rack 30 connected to a piston rod 31 on a piston 32 in a hydraulic cylinder 33 having hydraulic lines 34 and 35 connected to control valve 36 (Fig. 3). Also fixed on shaft 27 is a gear 38 which is the common central gear for a number of radially extending epicyclic gear trains, each having its outer gear 39 keyed to a sleeve or hollow shaft 40 as at 41, each sleeve being fixed on a fixture 12 (Fig. 5). An intermediate gear 42 is supported in operative position by an axially shiftable shaft 43 having a headed end portion 44 which rests on a circular track 45 in the base.

An axially shiftable shaft 47 in each sleeve 40 has a geared upper portion 48 extending into fixture 12 and forming a gear rack engaging a gear 49 on a radially extending shaft 50 journaled within fixture 12 as represented at 51 and 52 (Fig. 7). Shaft 50 has another gear 53 adjacent its outer end engaging the gear rack portion 54 of an axially shiftable locking pin 55. Pin 55 has a taper end portion 56 which in normal position wedge fits into a sleeve 57 in a recess 58 in table 11 to lock fixture 12 against rotation on the table. Sleeve 57 has an enlarged lower end portion 59 seated on an element 60 supported by compressed coil spring 61 to provide a shock absorber for lessening the impact between pin 55 and sleeve 57. Enlargement 59 cooperates with a shoulder 62 to contain sleeve 57 within recess 58 in the table.

Concentric around each shaft 47 is a bearing 65 supported by an annular cup 66 having a flanged top 67 engaging a shoulder 68 on table 12. Bearing 65 is normally spaced from the lower end 69 of sleeve 40. Each shaft 47 has a headed lower end portion 70 engageable within a vertically shiftable clevis 71 connected to a hydraulic motor at each machining station. Each motor includes a cylinder 72 having hydraulic pressure lines 73 and 74 and having a piston 75 with a piston rod 76 connected to a reciprocable gear rack 77. Each gear rack operates a gear 78 having a threaded interior for cooperation with a worm 79 for raising and lowering shaft 80 and clevis 71 thereon. One shaft 80 may have geared portion 81 for turning a gear 82 to actuate a timer (not shown). Hydraulic lines 73 and 74 on cylinders 72 are connected to a control valve 83.

Figure 6:
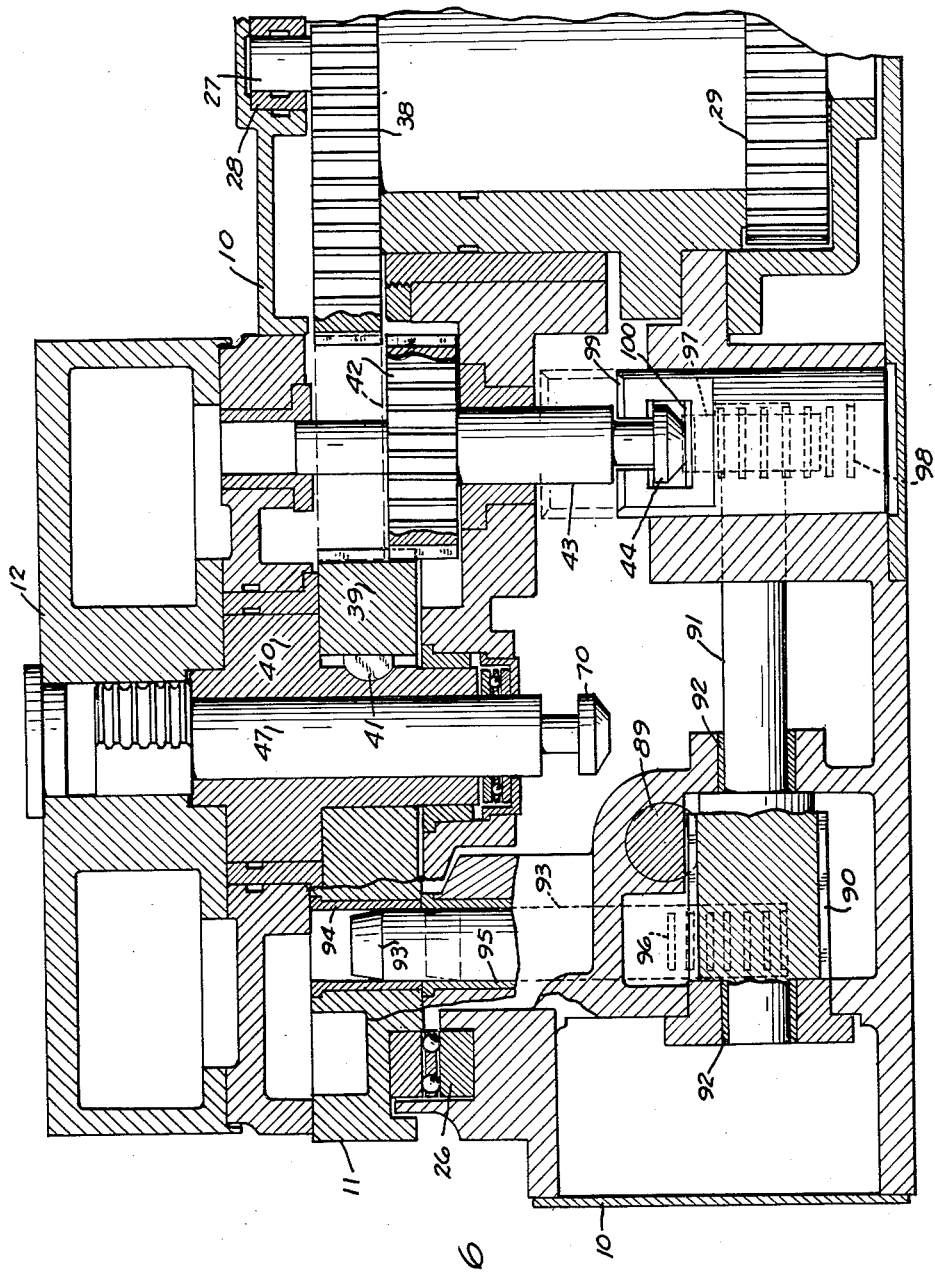
Fig. 6 is an enlarged, partly diagrammatic, sectional view taken on line 6—6 of Fig. 3.

Another hydraulic motor at the loading station has a cylinder 84, pressure lines 85 and 86 connected to a control valve 87, and a piston 88 with a piston rod connected to a gear rack 89 engaging a gear 90 on a shaft 91 journaled in base 10 as at 92 (Fig. 6). A locking pin 93 normally engaged in recesses 94 and 95 in table 11 and base 10, respectively, has a geared lower end portion forming a gear rack 96 engaging gear 90. Another gear 97 on shaft 91 engages the geared portion 98 of a vertically shiftable clevis element 99 which engages around the headed portion 44 of the shaft 43 of a fixture at the loading station. The bottom 100 of clevis 99 forms a vertically shiftable portion of circular track 45. Gear racks 96 and 98 are disposed on opposite sides of axle 91 so that rotation thereof shifts gear 42 and locking pin 93 in opposite directions.

Valves 36, 83 and 87 are operated respectively by operating members 105, 106 and 107 actuated by spring returned solenoids 108, 109 and 110. The valves may be connected to a common hydraulic pressure supply line 117 and may exhaust to a common conduit 118.

Fixtures 12 are shown as having locator studs 115 for positioning a gate valve body 20 thereon and having posts 116 and 117 supporting clamp element 21. Clamp 21 has one end pivoted on post 117 as at 118 with its other end bolted to post 118 in operative position as at 119. Secured centrally on clamp 21 is a shiftable head 120 having projections 121 adjustable by turning nut 122 for firmly engaging the top of a valve body to hold it securely in position for machining.

As to operation of the device it may be assumed that table 11, fixtures 12 thereon and machine tools 13 and 14 are stationary and that motors 17 are running. Pistons 32, 75 and 88 are in retracted position so that locking pins 55 are engaged within sleeves 57 to lock fixtures 12 non-rotatably on table 11 and so that locking pin 93 at the loading station is retracted as shown in dotted lines in Fig. 6 to permit table 11 to rotate on base 10 with intermediate gear 42 elevated into engagement with gears 38 and 39. A gate valve body 20 is positioned against studs 115 on fixture 12 at the loading station and clamped into position by clamp 21. The control valves and their operating members are in the solid line positions shown in Fig. 3.

The machine may be set into operation by such means as manually closing a switch (not shown) to actuate a circuit for energizing solenoid 108. Valve 36 is thereby shifted to the dotted line position to admit pressure through line 34 for advancing piston 32 and gear rack 30 to rotate central gear 38. Since fixtures 12 are locked to table 11 by pins 55, table 11 rotates with gear 38 to carry work piece 20 from the loading station to the machining station adjacent machine tool 13. At the same time another fixture is carried to the loading station. During rotation of the table intermediate gears 42 are supported in engaged position (Fig. 5) by shafts 43 whose headed ends slidably engage upon circular track 45.

When a fixture arrives at the loading station its headed end enters shiftable clevis 99 and rests on the bottom 100 thereof. Similarly, the headed end 70 of the shaft 47 on each fixture enters shiftable clevis 71 on arrival at a machining station. When a fixture arrives at the loading station solenoid 110 is actuated to shift valve 87 to the dotted line position to admit pressure through line 85 for advancing piston 88 and gear rack 89. Gear 90 is thereby rotated to lower gear 42 out of engagement with gear 38 and to elevate pin 93 for engagement within opening 94 to lock table 11 non-rotatably on base 10. These positions of gear 42 and pin 93 are shown in solid lines in Fig. 6.

When table 11 and gate body 20 thereon have thus been securely fixed in position, machine tool 13 is actuated and advances on its track 15 carrying rotating milling tool 18 into position for milling the seats 23 and 24 of valve body 20. Planetary head 16 then revolves tool 18 to perform the milling and machine tool 13 then retracts to its initial position, actuating a circuit for energizing solenoid 109 which, through operating member 106, shifts valve 83 to its dotted line position, admitting pressure through lines 74 for advancing pistons 75 and gear racks 77 thereon.

Racks 77 rotate gears 78 (Fig. 5) which, through their internal worms 79, elevate shafts 80 and clevises 71 thereon which in turn elevate shafts 47 so that gear racks 48 thereon turn gears 49, shafts 50 and gears 53. Each gear 53 engages the gear rack 54 on a locking pin 55 and withdraws it from sleeve 57 to unlock fixture 12 for rotation relatively to table 11. Upon continued upward movement, clevis 71 engages the bottom of cup 66 to elevate bearing 65 into supporting engagement with the lower end 69 of sleeve 40 which shifts fixture 12 out of engagement with table 11 so that the fixture is freely rotatable on bearing 65. Geared portion 81 of shaft 80 also rotates gear 82 to actuate a timer (not shown).

When fixtures 12 have been shifted for rotation on table 11, the circuit controlling solenoid 108 is opened to de-energize the solenoid so that operating member 105 and valve 36 are spring returned to the solid line position of Fig. 3, admitting pressure into line 35 for retracting piston 32 and gear rack 30 for rotating central gear 38. The fixtures 12 at the machining stations are rotated 180 degrees on table 11 while the table itself is locked into stationary position by pin 93. This rotation of the fixtures positions the opposite seat portion 23 of the gate valve body for machining by milling tool 18. The fixture at the loading station remains stationary since its intermediate gear 42 is disengaged from central gear 38.

The timer actuated by gear 82 then times out, opening a circuit to de-energize solenoids 109 so that operating elements 106 and valves 83 are spring returned to their solid line positions, admitting pressure to lines 73 to retract pistons 75 and gear racks 77. Each clevis 71 is lowered to its initial position, lowering fixtures 12 into engagement with table 11 and forcing pins 55 into wedging engagement within sleeves 57 for securely locking the fixtures non-rotatably on the table. Spring 61 lessens the impact of the engagement of pin 55 and sleeve 57.

Machine tool 13 is again advanced, milling tool 18 machines the second valve seat 23 and the machine tool retracts to its initial position. The circuit controlling solenoid 110 is thereby opened, de-energizing the solenoid so that operating element 107 and valve 87 are spring returned to solid line position of the valve, admitting pressure into line 86 for retracting piston 88 and gear rack 89. Gear 90 is thereby rotated, lowering pin 93 out of engagement with recess 94 and elevating clevis 99 to re-engage gear 42 with gear 38. In the meantime, a gate valve body has been clamped on the fixture at the loading station.

Figure 4:
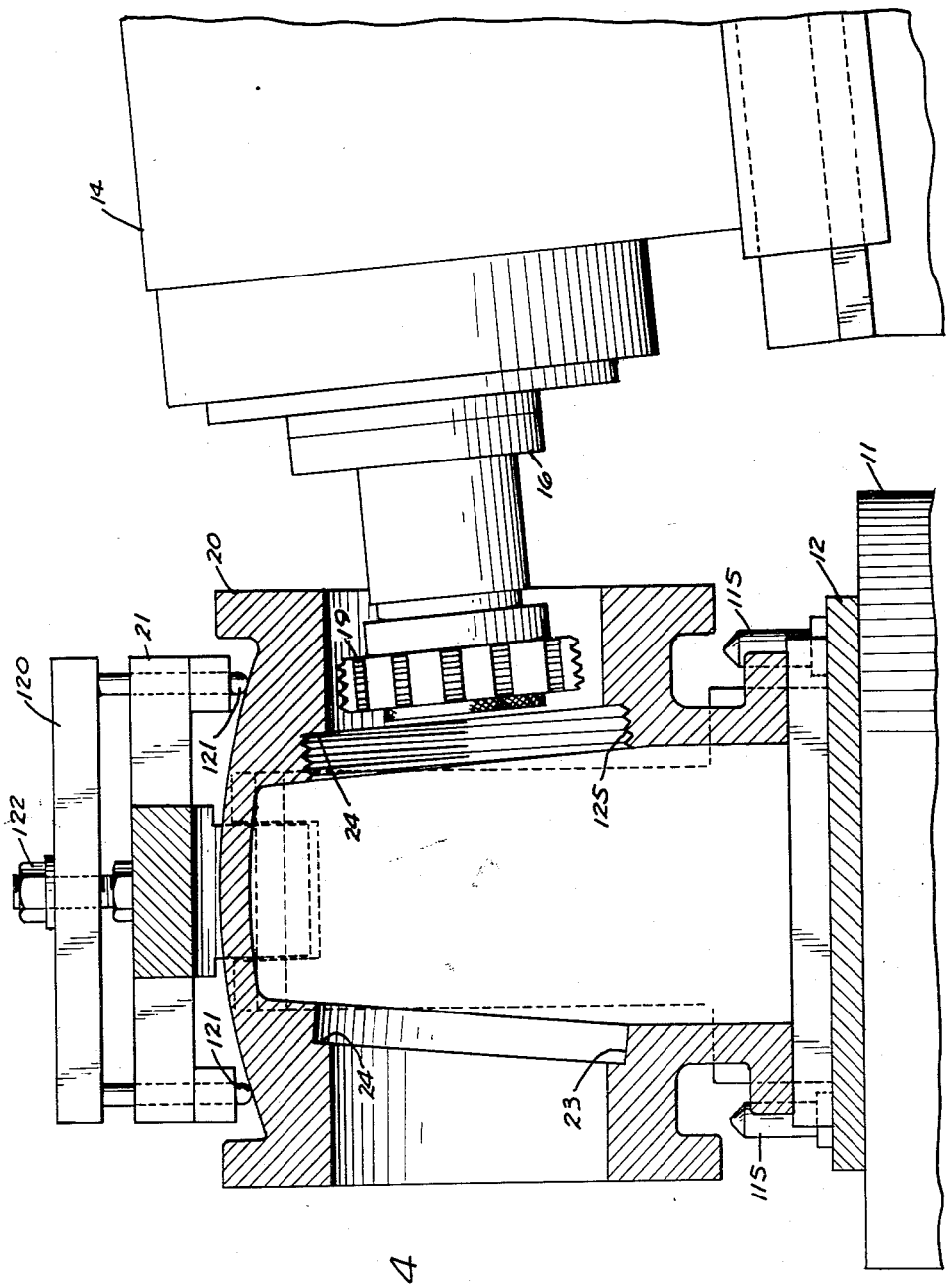
Fig. 4 is an elevational view of a gate valve body at the threading station with some parts shown in section.

The system is now in its initial condition and the cycle described above automatically repeats itself. Table 10 is rotated to carry a new gate valve body into position for milling by machine tool 13 and at the same time the valve body which was milled in the previous cycle is carried to the machining station adjacent machine tool 14 for threading (Fig. 4). Machine tools 13 and 14 advance and retract simultaneously for performing their respective operations and the valve bodies adjacent thereto are rotated simultaneously 180 degrees to present opposite sides thereof to the machine tools for machining. In the meantime another gate valve body is clamped onto the third fixture. When table 11 is again rotated the milled and threaded gate valve body returns to the loading station where it is removed and replaced. Surfaces 23 have been threaded as shown at 125 in Fig. 4 for receiving valve insert rings (not shown) and faces 24 have been accurately machined for pressure sealing against the insert rings.

The cycle is fully automatic except for the steps of loading and unloading the fixtures. The device can be used for machining and threading the valve insert rings as well as the valve bodies and in general may be used for performing multiple operations simultaneously on a plurality of various kinds of work pieces. Planetary heads 16 carry the milling and threading tools 18 and 19 in a precise path relatively to valve seats 23 and 24 so that the machining thereof is accurate.

Thus it is seen that the invention provides a device which rapidly and accurately performs a number of machining operations simultaneously and in a desired sequence on a plurality of relatively bulky work pieces such as gate valve bodies. At the same time the machine can normally be operated and attended by a single operator, thereby minimizing the man hours required for the production of each article. The device is relatively compact and is thus economical of factory floor space.

I claim:

1. Apparatus for performing a plurality of machining operations on workpieces such as gate valve bodies or the like comprising, a base, a carrier rotatable on said base, a plurality of fixtures seating on said carrier, each being shiftable in a direction axial of said carrier and being rotatably indexible relative to said carrier, said fixtures being adapted to hold workpieces, a plurality of gear trains, said gear trains having a common gear rotatable relative to said base and said carrier, each gear train having a gear on one of said fixtures, first motor means operatively connected to said common gear, first locking means releasably locking said fixtures to said carrier and second locking means releasably locking said carrier to said base, whereby to hold workpieces on said fixtures substantially stationary at machining stations, second motor means operative to release and reset said first locking means for fixtures at said machining stations and including means operative to shift such fixtures axially from their seats on said carrier to facilitate indexing thereof, third motor means operative to release and reset said second locking means to facilitate rotation of said carrier, a plurality of machine tools adjacent said carrier and positioned at said machining stations, powered means moving said tools to and from operative position, control means coordinated with said powered means operative to actuate said first motor means after each machining operation, and other control means operative to actuate said second and third motor means in a predetermined sequence after each machining operation, whereby in such sequence to carry workpieces from one station to another and to rotate different portions thereof toward said tools for machining.

2. Apparatus for performing a plurality of machining operations on workpieces such as gate valve bodies or the like comprising, a base, a carrier rotatable on said base, a plurality of fixtures seating on said carrier, each being shiftable in a direction axial of said carrier and being rotatably indexible relative to said carrier, said fixtures being adapted to hold workpieces, a plurality of gear trains, said gear trains having a common gear rotatable relative to said base and said carrier, each gear train having a gear on one of said fixtures, first motor means operatively connected to said common gear, first locking means releasably locking said fixtures to said carrier and second locking means releasably locking said carrier to said base, whereby to hold workpieces on said fixtures substantially stationary at machining stations, said first locking means including a locking pin engaged between each fixture and said carrier, said locking pins being shiftable to unlocked position, a second motor means at each machining station, and locking pin operating means operable by said second motor means to shift said locking means, said fixtures including means operable by said second motor means for shifting the same axially, whereby to unlock said fixtures from said carrier and shift said fixtures axially from their seats on said carrier to facilitate indexing thereof, third motor means operative to release and reset said second locking means to facilitate rotation of said carrier, a plurality of machine tools adjacent said carrier and positioned at said machining stations, powered means moving said tools to and from operative position, control means coordinated with said powered means operative to actuate said first motor means after each machining operation, and other control means operative to actuate said second and third motor means in a predetermined sequence after machining operations, whereby in such sequence to carry workpieces from one station to another and to rotate different portions thereof toward said tools for machining.

3. Apparatus for performing a plurality of machining operations on workpieces such as gate valve bodies or the like comprising, a base, a table rotatable on said base, a plurality of fixtures adapted to hold workpieces and seating on said table, a plurality of epicyclic gear trains on said table, said gear trains having a common central gear rotatable relative to said base and said table, each gear train having an outer gear with an axially shiftable central sleeve fixed on a fixture, a shaft projecting concentrically and axially shiftable through each sleeve, a first locking pin engaging between each fixture and said table shiftable to inoperative position, means operatively connecting said shafts and first locking pins, a second locking pin engaging between said base and said table shiftable to unlocked position, each gear train having an axially disengageable intermediate gear between said common gear and outer gear, a track on said base supporting said intermediate gears in operative position, said track having a shiftable portion at said loading station to facilitate disengaging said intermediate gear, first motor means operable to rotate said central gear, second motor means at each machining station, means operable by said second motor means to shift said shaft and said sleeve sequentially to facilitate unlocking, elevating, lowering, and relocking said fixtures relative to said table, third motor means at said loading station operable to shift said locking pin and said shiftable portion of the track for alternative movement thereof, a plurality of machine tools positioned adjacent said machining stations, powered means moving said tools to and from operative position, control means coordinated with said powered means operative to actuate said first motor means after each machining operation, and other control means operative to actuate said second and third motor means in a predetermined sequence after machining operations.

4. Apparatus for performing a plurality of machining operations on work pieces comprising, a base, a carrier rotatable on said base, a plurality of fixtures seating on said carrier and being axially shiftable and rotatably indexible relative thereto, said fixtures being adapted to hold work pieces, a plurality of gear trains, said gear trains having a common gear rotatable relative to said base and said carrier, each gear train having a gear on one of said fixtures, first motor means operatively connected to said common gear, first locking means releasably locking said fixtures to said carrier and second locking means releasably locking said carrier to said base, whereby to hold work pieces on said fixtures substantially stationary at machining stations, second motor means operative to release and reset said first locking means for fixtures at said machining stations and including means operative to shift such fixtures axially from their seats on said carrier to facilitate indexing thereof, third motor means operative to release and reset said second locking means to facilitate rotation of said carrier, a plurality of machine tools adjacent said carrier and positioned at said machining stations, powered means moving said tools to and from operative position, control means coordinated with said powered means operative to actuate said first motor means after each machining operation, and other control means operative to actuate said second and third motor means in a predetermined sequence after each machining operation, whereby in such sequence to carry work pieces from one station to another and to rotate different portions thereof toward said tools for machining.

5. Apparatus for performing a plurality of machining operations on work pieces comprising, a base, a carrier rotatably mounted on said base, a plurality of fixtures on said carrier adapted to hold work pieces and arranged so that when said carrier is rotated said fixtures are carried to a plurality of machining stations and a loading station, each of said fixtures being rotatably indexible on said carrier to present different portions of a work piece thereon for machining at said machining stations, first locking means operable to releasably lock said fixtures substantially non-rotatably on said carrier, second locking means operable to releasably lock said carrier substantially non-rotatably on said base, whereby to hold workpieces at said machining stations substantially stationary, operating means for releasing said locking means and returning the same to operative condition, motor means, means operable by said motor means to rotate said carrier when said second locking means is released and said first locking means is operative, means operable by said motor means to index said fixtures on said carrier when said first locking means is released and said second locking means is operative, coordinating means operable to actuate said motor means at predetermined intervals and to actuate said operating means to release said first and second locking means in a predetermined sequence whereby at said intervals and in said sequence to rotate said carrier for shifting said fixtures from station to station and to index said fixtures on said carrier while at said stations, and disconnecting means operable to disconnect the operative connection between said motor means and a fixture at said loading station so that the latter fixture may remain stationary to facilitate loading and unloading thereof while other fixtures are indexed on said carrier.

6. The structure defined in claim 5 wherein said coordinating means is arranged to alternately actuate said operating means and disconnecting means to release said second locking means and disconnect the operative connection between said motor means and a fixture at said loading station.

7. The structure defined in claim 6 and including second motor means operative to release and reset said first locking means for fixtures at said machining stations and third motor means operative to release and reset said second locking means and to disconnect and reconnect the operative connection between the first mentioned motor means and the fixture at said loading station.

8. The structure defined in claim 5 wherein said fixtures are seated on said carrier and are axially shiftable away from their seats on said carrier to facilitate indexing of said fixtures on said carrier.

References Cited in the file of this patent

UNITED STATES PATENTS

| | | |
|---|---|---|
| 1,574,631 | Mirfield | Feb. 23, 1926 |
| 1,976,104 | Archea | Oct. 9, 1934 |
| 2,086,849 | Bullard | July 13, 1937 |
| 2,086,852 | Bullard et al. | July 13, 1937 |
| 2,244,985 | Armitage | June 10, 1941 |
| 2,390,596 | Larson | Dec. 11, 1945 |
| 2,536,727 | Crawley | Jan. 2, 1951 |
| 2,651,832 | Menard | Sept. 15, 1953 |
| 2,669,011 | Brumbaugh | Feb. 16, 1954 |